Figures 1, 2, 3:
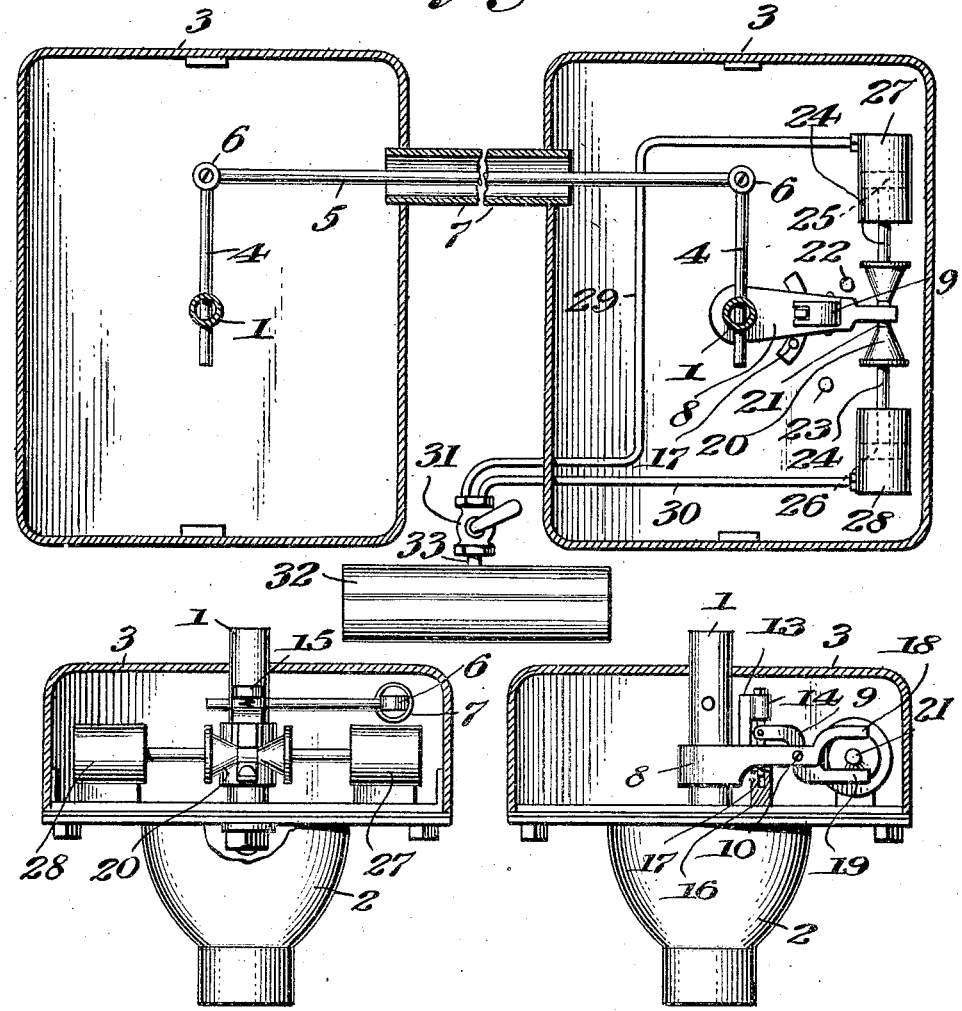

May 18, 1926.

C. E. BLACKBURN

SWINGING AUTOMOBILE HEADLIGHT

Filed Jan. 2, 1926

1,584,720

Inventor,
Charles Ellis Blackburn

By

Atty.

Patented May 18, 1926.

1,584,720

UNITED STATES PATENT OFFICE.

CHARLES ELLIS BLACKBURN, OF EVANSVILLE, INDIANA.

SWINGING AUTOMOBILE HEADLIGHT.

Application filed January 2, 1926. Serial No. 78,872.

This invention relates to swinging automobile headlights.

The object of the invention is to provide novel means for swinging or deflecting headlights to automobile headlights to deflect the beams of light laterally toward the side of the road or street so they will not be directed at the face of the driver of a car approaching from the opposite direction.

A lateral deflection or turning through an arc of ten to fifteen degrees is usually sufficient to accomplish the object of the invention, but the deflection may be through arcs of a greater or lesser number of degrees.

My invention relates, more particularly to the means for swinging or operating the headlights. Therefore, I may employ pistons and cylinders subject to suitable control of air, gas or other fluid for actuating the operating means, or electrically or electro-magnetically actuated operating means. Hence, except where specifically recited in the claims, it to to be understood that the invention is not limited to any particular means for actuating the mechanism which swings the headlights and locks them either in normal position or in deflected position. I have illustrated air operated pistons and cylinders, subject to suitable valve control whereby the headlight operating means may be operated, but this is only by way of illustration, as previously explained.

The headlights are mounted to swing on upright axes and are cross coupled so that they will move in unison. An operating arm is employed for turning the mounting of one of the headlights. This arm is subject to actuation in one direction or the other by a reciprocatory double cone, which, in turn, is moved in one direction or the other by the air operated or electrically operated means employed for controlling the mechanism. The operating arm is combined in a novel fashion with a latching device which, also is subject to operation by the double cone. The latching device locks the operating arm in its respective positions.

A practical embodiment of the invention is shown in the accompanying drawing and set forth in the following specification.

Modifications may be resorted to in respect to the improved operating mechanism, aside from the means by which said operating mechanism is operated.

In the accompanying drawings:—

Figure 1 is a horizontal section through the shells and certain parts, the operating mechanism appearing in full lines; and Figures 2 and 3, are sections through one of the shells showing the headlight mountings and the operating mechanism in full lines.

The headlights are carried by rockable upright mountings 1, which, in turn are mounted in brackets 2 carried by the automobile. The operating mechanism is contained within either of the housings 3 but it is not necessary to duplicate the operating mechanism as the provision of one mechanism is sufficient.

The rockable mountings 1 are provided with arms 4 which are cross-connected by a rod 5 pivoted to them at 6 and running freely through a tube 7 which connects the housings 3. Thus, protection is obtained from the weather and from accidental injury to the cross connections.

The rockable mounting 1 has suitably secured thereto an operating arm 8 by which said mounting 1 is rocked, and through the connections 4, 5, the other mounting 1 is correspondingly rocked.

There is a latch-operator 9 which is pivoted to the arm 8 at 10 and is pivoted at 11 to the locking pin or latch 12 which is arranged to operate vertically. The bracket 13 carried by the arm 8 has a socket or barrel 14 in which the upper end of the locking pin or latch 12 slides. An expansible coil spring 15 contained within the barrel or socket 14, presses on the upper end of the latch or pin 12 and forces it downwardly.

Located below the arm 8 is a locking segment 16 which has two holes 17 spaced at such distance apart and so located that when the pin 12 is in one of these holes, the headlights will be directed straight ahead for use, but when the locking pin is in the other hole 17, the arm 8 will then be disposed at an angle of over ten to fifteen degrees, more or less, to its normal position so that the headlights will then be located in the deflected or swung position representing the travel through an arc from ten to fifteen degrees more or less.

The pivot 10 for the latch operator 9 passes through an intermediate part of said latch operator so that the ends 18 and 19 of the arm 9 and latch operator 9 are arranged in scissorslike disposition for the purpose which will now appear.

The arm 8 is swung and the latch operator 9 is actuated against the tension of the spring 15, or released, by a double cone 20 which has an intermediate part 21. When the double cone 20 is moved in one direction it will swing the arm 8 in the direction of its movement and when moved in the opposite direction it will swing said arm in the opposite direction but said cone will first depress the outer end of the latch operator 9, thereby releasing the latch or pin 12 from the hole 17 in which it is at that time received. When the operation of the double cone 20 ceases the spring 15 acts and forces the pin or latch 12 into the socket or hole 17 over which it is at that time positioned.

I have illustrated air controlled means for operating the double cone but it is clear that electrically operated means or electro-magnetically operated means, solenoids for instance, subject to suitable switch control could be substituted and it is to be understood, therefore, that I do not limit my claims except where specified to any particular means for moving the double cone 20 to and fro.

Bumpers 22 and 23 arrest the arm 8 at points representing the desired limits of its travel in opposite direction.

As shown, the cone 20 is carried by a rod 24 which has pistons 25, 26, operating in cylinders 27, 28. The cylinders are, respectively, subject to fluid pressure through pipes 29, 30, controlled by a suitable valve 31 to which the fluid pressure is delivered from the tank 32 by a pipe 33. Any suitable means may be provided for admitting compressed air to the tank 32, for instance, it may have an air connection so that it may be charged at any gasoline service station from the air supply there, or, the pressure may be pumped up by a hand pump.

It is to be understood that the cylinders 27 and 28 may utilize the exhausts from the engine as the motive fluid, under suitable valve control. On the other hand, the cylinders 27, 28, may be operated by vacuum from the vacuum tank of the automobile, under suitable valve control.

Whatever the operating means for shifting the double cone 20, assuming that the headlights are directed straight ahead, the latch 12 will then be in that one of the holes 17 which will cause the arm 8 to be locked as shown in the drawings. The reduced part 21 of the double cone will then lie between the ends 18 and 19. On moving the double cone 20 for the purpose of swinging the arm 8 to turn or deflect the headlights, one section of the cone relatively spreads apart the ends 18 and 19, the latch operator 9 then turning on its pivot 10, resulting in the withdrawal of the pin 12 from the hole 17. Immediately the pin has been withdrawn from the hole the continued advance of the double cone, causes swinging of the arm 8 until it is arrested by the bumper 23. The headlights are then in their deflected position so that the rays of light will not flash in the face of the driver approaching from the opposite direction. The latch 12 is then over the remaining hole 17. On release of the pressure or vacuum or cutting off the electricity, as the case may be, the spring 15 will then snap the pin 20 into the said hole 17 and lock the arm 8 in its deflected position so that the headlights will remain where turned. When it is desired to restore the headlights to normal position, movement of the cone 20 in the opposite direction is brought about by operating the valve or electrical switch, whereupon the other section of said cone first unlatches the pin 12 and then the continued movement of the cone swings on arm 8 back to its normal position where it is arrested by bumper 22. The spring 15 then forces the pin 12 into the other hole 17.

What I claim is:

1. Means for swinging headlights comprising a rotatably mounted member for turning the headlights, means carried by said member adapted for latching it in its respective positions, and an actuator adapted, when operated, to first automatically unlatch the rotatably mounted member and then to swing said rotatably mounted member.

2. Means for swinging headlights comprising a rotatably mounted member for turning the headlights, means for latching said member in its respective positions, and a double cone actuator adapted, when operated, to first automatically unlatch the rotatably mounted member and then to swing said rotatably mounted member.

3. Means for swinging headlights comprising a rotatably mounted arm for turning the headlights, a latch operator movably mounted on, and carried by, said arm, a locking latch operated by said latch operator and an actuator adapted first to operate the latch operator to release the latch and thereafter to swing the arm.

4. Means for swinging headlights comprising a rotatably mounted arm for turning the headlights, a latch operator movably mounted on, and carried by, said arm, a locking latch operated by said latch operator and a removably mounted double cone adapted first to operate the latch operator to release the latch and thereafter to swing the arm.

In testimony whereof I affix my signature.

CHARLES ELLIS BLACKBURN.